(12) United States Patent
Araya et al.

(10) Patent No.: US 10,102,108 B2
(45) Date of Patent: Oct. 16, 2018

(54) INJECTED INSTRUMENTATION APPLICATION MONITORING AND MANAGEMENT

(71) Applicant: Mobilize.Net Corporation, Bellevue, WA (US)

(72) Inventors: Carlos Araya, Cartago (CR); Paul Edward Butterworth, Alamo, CA (US)

(73) Assignee: Mobilize.Net Corporation, Bellevue, WA (US)

( * ) Notice: Subject to any disclaimer, the term of this patent is extended or adjusted under 35 U.S.C. 154(b) by 54 days.

(21) Appl. No.: 14/997,385

(22) Filed: Jan. 15, 2016

(65) Prior Publication Data
US 2016/0224461 A1   Aug. 4, 2016

Related U.S. Application Data

(60) Provisional application No. 62/104,012, filed on Jan. 15, 2015.

(51) Int. Cl.
*G06F 9/44*      (2018.01)
*G06F 11/36*    (2006.01)

(52) U.S. Cl.
CPC .................. *G06F 11/3644* (2013.01)

(58) Field of Classification Search
None
See application file for complete search history.

(56) References Cited

U.S. PATENT DOCUMENTS

2012/0144246 A1* 6/2012 Dreyfoos .............. G06F 11/302
                                                                  714/47.1

* cited by examiner

*Primary Examiner* — Chuck Kendall
(74) *Attorney, Agent, or Firm* — Han Santos, PLLC (57) ABSTRACT

Techniques to instrument computer applications to receive run-time telemetry, and to perform analysis on collected telemetry are described. Telemetry instrumentation is injected into an application via an application migration tool. The migration tool generates source code corresponding to a target computing architecture. During the generation of source code, the migration tool injects code capable of sensing specified events and/or event categories and reporting telemetry to a data store. The data store may be queried and/or accessed to perform analysis to detect suboptimal instrumentation and/or application errors. Use cases may include the detection of performance, health, security and usability issues.

25 Claims, 5 Drawing Sheets

INJECTED INSTRUMENTATION APPLICATION MONITORING AND MANAGEMENT

RELATED APPLICATIONS

This U.S. patent application claims priority to U.S. Provisional patent application, "Injected Instrumentation Application Monitoring and Management", Application Ser. No. 62/104,102, filed Jan. 15, 2015 and is hereby incorporated by reference.

BACKGROUND

Programmers developing computer applications desire to write applications, also known as programs, with minimal errors. Accordingly, a wide range of programming tools have evolved to detect various types of errors in applications of various types. Errors may be detected statically, by analyzing source code, without the need to execute the program. For example, compilers typically detect syntax errors in source code while compiling. Other static analysis tools, such as lint, scan source code for patterns likely to result in errors, such as infinite loops and common programming errors.

Other errors may be detected dynamically i.e., during executing the application, also known as during run time. Programming libraries, such as the C Runtime Library include trace( ) and assert( ) functions to provide run time checks while running in debug mode. The trace( ) function performs an indication that a particular portion of source code has been executed. The assert( ) function performs precondition checks.

Trace points and other break points for run time testing of applications, may be inserted by tools dynamically. For example debuggers allow for the insertion of debug points such that the program and potentially to perform some function for the programmer. Profilers may insert trace points to measure execution speed and other performance metrics during run time.

However, prior art tools are typically directed towards a monolithic architecture, where an application is written almost solely in a single language. Present day applications generally are not effectively tested with prior tools because present day applications are typically distributed across multiple layers, and servers often in different localities. For example, a mobile device may run an HTML web page with some JavaScript for a client layer, which calls a Java applet on an application server miles away comprising a customer server or business logic layer, which in turn calls resources in a resource layer in the form of a Structured Query Language (SQL) based database and a NoSQL (non-SQL) based database. Accordingly, not only are there different application layers to be traversed, but each layer may be programmed with a mix of programming languages, each with their own respective grammar, thereby increasing complexity.

Furthermore, run time metrics are different from those measured with prior art tools. For example performance for a distributed application will relate to performance of the entire application rather than for a layer or object in the application. Other metrics, not addressed by prior art tools have arisen in importance such as application health, security and usability.

BRIEF DESCRIPTION OF THE DRAWINGS

The Detailed Description is set forth with reference to the accompanying figures.

DETAILED DESCRIPTION

Context of Injected Instrumentation Application Monitoring and Management

Application monitoring and management is the collection of telemetry during run time of a computer application, also known as a computer program. Telemetry may be monitored at run-time or analyzed long after the computer application has completed execution. Telemetry includes data collected on the running computer application which a programmer may use to remove errors and inefficiencies in the computer application.

Figure 1:
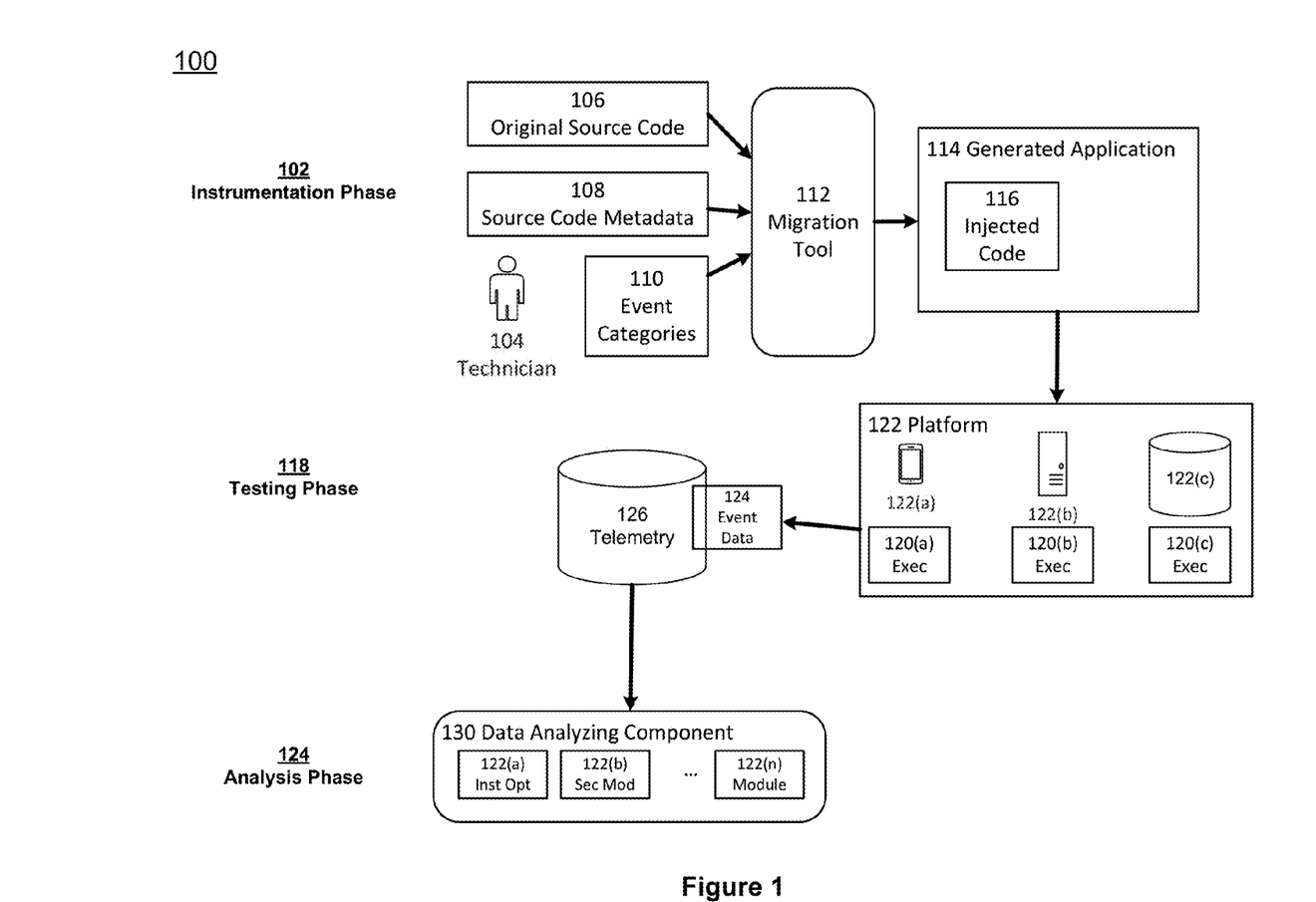
FIG. 1 is a context diagram of injected instrumentation application monitoring and management.

A programmer may go through various stages in performing injected instrumentation application monitoring and management as illustrated with respect to the context diagram 100 in FIG. 1. In an Instrumentation Phase 102, a technician 104 receives source code 106 for a computer application and metadata 108 with respect to the source code 106. The technician 104 will then identify one or more event categories 110 to collect telemetry on.

The source code 106 will generally be based on a source computing architecture, which specifies different layers and components of the computer application. Based on the metadata 108 and/or the event categories 110, the source code 106 and metadata 108 will be input into a migration tool 112 that generates source code for a target computing architecture. Note that the target computing architecture may specify a different architecture than the source computing architecture where the target computing architecture may be comprised of components using programming languages and of application layers different than the source computing architecture. An example case is the migration of a two-tier client server application comprised of a personal computer application and a database, to a three-tier web application comprised of a web client, a middle tier application, and a database. The migration tool 112 then generates source code 114 for the target computing application.

Accordingly, the migration tool 112 is capable of injecting instrumentation 116 into the generated source code 114. The instrumentation 116 will generally comprise sensor and reporting source code added by the migration tool 112 specifically to perform sensing of events corresponding to the event categories 110 as specified by the technician 104 and to perform reporting of those events. The migration tool 112 and associated techniques are described in more detail with respect to FIG. 5 and other sections below.

In a Testing Phase 118, the target source code 114 is compiled into executables 120 if necessary, and deployed to a test platform 122. Note that the test platform may be distributed. For example, a web client may be accessed from a mobile device 122(*a*), the business logic may reside on a customer server 122(*b*), and data may reside on a database server 122(c). In general, the test platform 122 will correspond to the target computing architecture.

After deployment, the deployed executables 120 are run. During run time, the injected instrumentation 116 (compiled into the deployed executables 120) will transmit reporting of event data 124. The transmitted event data 124 is then received by a telemetry data store 126. The event data 124 is now ready for analysis. The generation and collection of event data 124 is described in more detail with respect to FIGS. 5 and 6.

In an Analysis Phase 128, the event data 124 is analyzed to detect application errors and suboptimal instrumentation. Specifically, the collected event data 124 in telemetry data store 126 may be queried and/or otherwise accessed by data analyzing component 130 to detect various error or suboptimal conditions. The data analyzing component 130 may have modules 130(a-n) containing rules and analysis routines specific to an error or condition. In FIG. 1, Instrumentation optimization module 130(a) comprises rules and analysis routines specific to determining whether instrumentation may be reconfigured to perform testing with less performance overhead. Security module 130(b) comprises rules and analysis routines to detect indications of security vulnerabilities. Data analysis along with the collection of event data is described in more detail with respect to FIG. 5. Instrumentation optimization and other scenarios and use cases are described in the concluding sections.

Note that the Analysis Phase 128 may be done during run time, and thereby may overlap in time with the Testing Phase 118.

Exemplary Hardware, Software and Communications Environment

Computing Device

Figure 2:
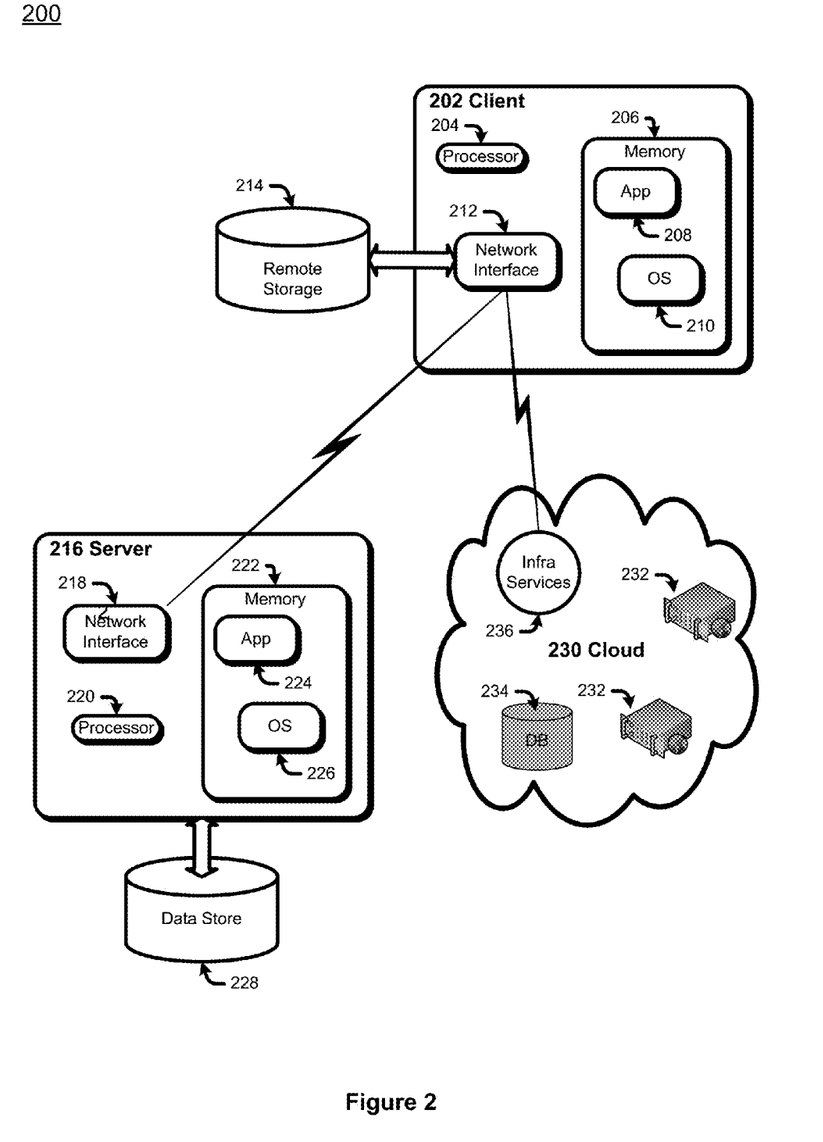
FIG. 2 is a flow chart of an exemplary hardware, software and communications environment for injected instrumentation application monitoring and management.

Prior to disclosing Injected Instrumentation Application Monitoring and Management and related techniques, an exemplary hardware, software and communications environment is disclosed. FIG. 2 illustrates several possible embodiments of a hardware, software and communications environment 200 for Injected Instrumentation Application Monitoring and Management and related techniques.

Client device 202 is any computing device. Exemplary computing devices include without limitation personal computers, tablet computers, smart phones, and smart televisions and/or media players.

Injected Instrumentation Application Monitoring and Management and related techniques may be used in a number of platform contexts. Although Injected Instrumentation Application Monitoring and Management and related techniques may be brought to bear on a typical networked client device 202 accessing a remote server, Injected Instrumentation Application Monitoring and Management and related techniques alternatively may be implemented on a standalone computer.

A client device 202 may have a processor 204 and a memory 206. Client device 202's memory 206 is any computer-readable media which may store several software components including an application 208 and/or an operating system 210. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD), Blu-Ray or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, client device 202 may have a network interface 212. The network interface 212 may be one or more network interfaces including Ethernet, Wi-Fi, or any number of other physical and data link standard interfaces. In the case where the user need only do operations on a standalone single machine, the network interface 212 is optional.

Client-Server/Multi-Tier

Client device 202 may communicate to a server 216. Server 216 is any computing device that may participate in a network. The network may be, without limitation, a local area network ("LAN"), a virtual private network ("VPN"), a cellular network, or the Internet. The client network interface 212 may ultimate connect remote networked storage 214, or to server 216 via server network interface 218. Server network interface 218 may be one or more network interfaces as described with respect to client network interface 212.

Server 216 also has a processor 220 and memory 222. As per the preceding discussion regarding client device 202, memory 222 is any computer-readable media including both computer storage media and communication media.

In particular, memory 222 stores software which may include an application 224 and/or an operating system 226. Memory 218 may also store applications 224 that may include without limitation, an application server and a database management system. In this way, client device 202 may be configured with an application server and data management system to support a multi-tier configuration.

Server 216 may include a data store 228 accessed by the data management system. The data store 228 may be configured as a relational database, an object-oriented database, a NoSQL database, and/or a columnar database, or any configuration to support scalable persistence.

Cloud

The server 216 need not be on site or operated by the client enterprise. The server 216 may be hosted in the Internet on a cloud installation 230. The cloud installation 230 may represent a plurality of disaggregated servers which provide virtual web application server 232 functionality and virtual database 234 functionality. Cloud 230 services 232, 234 may be made accessible via cloud infrastructure 236. Cloud infrastructure 236 not only provides access to cloud services 232, 234 but also billing services. Cloud infrastructure 236 may provide additional service abstractions such as Platform as a Service ("PAAS"), Infrastructure as a Service ("IAAS"), and Software as a Service ("SAAS").

Architecture for Instrumentation Injection Application Monitoring and Management As previously mentioned, Instrumentation Injection Application Monitoring and Management may be performed on a wide variety of platforms and environments. A general architecture for Instrumentation Injection Application Monitoring and Management may separate functions across different servers and across different premises.

Figure 3:
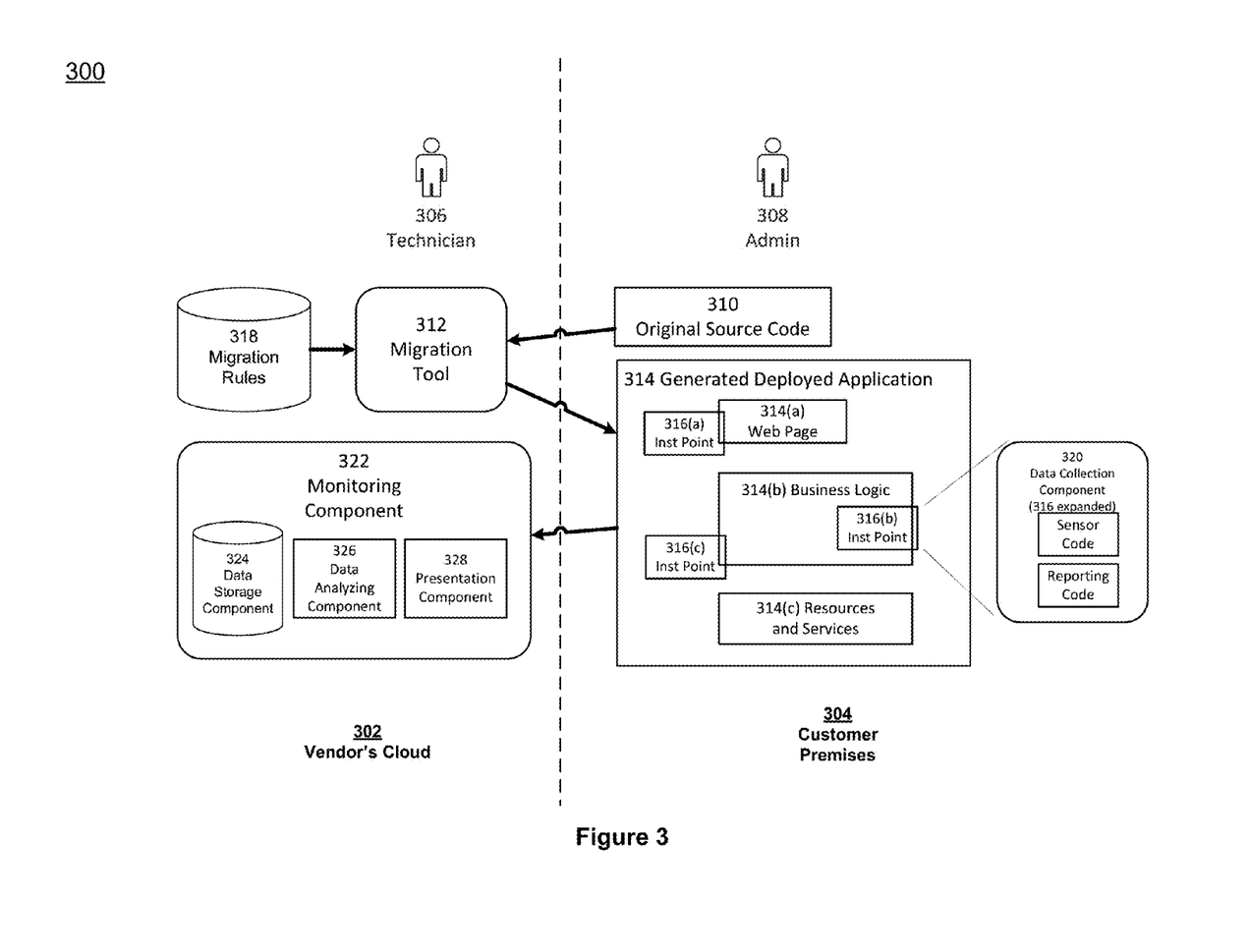
FIG. 3 is an architectural diagram of a software as a service type architecture for injected instrumentation application monitoring and management.

FIG. 3 provides an architectural diagram 300 for an architecture for Instrumentation Injection Application Monitoring and Management implemented as a software as a service. Specifically, monitoring, comprised of the data collection during the Testing Phase 118 and the Analytics Phase 128 may be performed in a monitoring and management vendor's cloud 302, separate from a customer's premises 304. The customer's premises may be a local area network for the customer's enterprise, or alternatively a private cloud, a leased cloud, or some combination thereof. A vendor's technician 306 would have access to the vendor's cloud 302 and subject to a grant of access from a customer's IT administrator 308, would have access to portions of the vendor's cloud 302.

The technician 306 would access the source code 310 for the application to be instrumented, resident on the customer's premises 304. Based on the event categories to be instrumented, the source code 310 would be ported to a source code base for a target computing architecture via a migration tool 312, with instrumenting source code injected. The resulting source code base would be potentially compiled or otherwise converted to executable form of a target computing application 314 hosted on the customer's premises 304. In FIG. 3, target computing application is divided in to different layers 314(a-n) and with different instrumentation points 316(a-n).

The migration tool 312 would access a data store 318 containing metadata to perform the instrumentation, which may include record formats, transition states, instrumentation scenarios and alert rules. The particulars of the instrumentation process via the migration tool 312 are described in further detail with respect to FIG. 4.

The injected code may be a data collection component 320 comprised of sampling code and reporting code such as the injected instrumentation 114 in FIG. 1. Alternatively, the data collection component 320 may include code to delegate to an external monitor.

The data collection component 320 may be associated with metadata relating to its deployment. Example metadata may include a unique identifier, such as a Globally Unique Identifier (GUID), and a time stamp of when the data collection component 320 was deployed. In this way, the reporting code may associate the identity of the data collection component 320 and/or the time of deployment with reported data. The reporting code may also create a unique transaction identifier, for example in the form of a GUID, to uniquely identify reported event data such as event data 124 in FIG. 1.

A monitoring component 322 may reside in vendor cloud 302 to collect reported data. Specifically, the monitoring component 322 collects information from the executing application under test 314. The data may be reported, using a flexible format such as JSON. The monitoring component 322 may execute as a separate service that collects and records the data for reporting purposes and for real-time or offline analysis. The monitoring component 322 and its associated resources may be replicated on vendor's cloud 302 for high availability.

Client portions of an application 314 generally report information to the services they use when they communicate with those services. Services generally collect information internally, and reported directly to the monitoring component 322. Accordingly, service portions of an application 314 are responsible for forwarding the client information to the monitoring component 322.

The monitoring component 322 is comprised of a data storage component 324, a data analyzing component 326, and a presentation component 328. Data analyzing component is 326 is notated 130 with respect to FIG. 1.

One embodiment of the data storage component 324, is a database such as telemetry data store 126. Utilities may also be used to export the data from the data store into in traditional log file formats or as a simple network management protocol (SNMP) management information base (MIB).

Note that the data storage component 324 need not be SQL database. In one embodiment, the recorded data is formatted in JSON and may be stored in a NoSQL database, stored in key-value pairs potentially resulting in a large table of sparse vectors. Example implementations may be using the MongoDB or Cassandra NoSQL databases. In this way, machine-learning and automated analytics techniques may be applied against the data storage component 324.

By keeping the architecture of the Monitor simple, it will also be possible to deploy in a private cloud for those users unwilling or unable to trust their data to a public cloud.

The data analyzing component 326 comprises all logic to analyze the data in data storage component 324. Data analysis is described in greater detail with respect to FIGS. 4 and 5.

The monitoring component 322 contains a collection of (pattern matching) rules that will trigger alert events to be sent to a presentation component 328. The presentation component 328 may be in the form of a console or dashboard type application accessible by technician 306. In one embodiment, the presentation component 328 displays a summary of one more applications under test 114. In another embodiment, the presentation component 328 is a mobile application running on a technician's mobile device 330.

Injection Instrumentation Application Monitoring and Management

Figure 4:
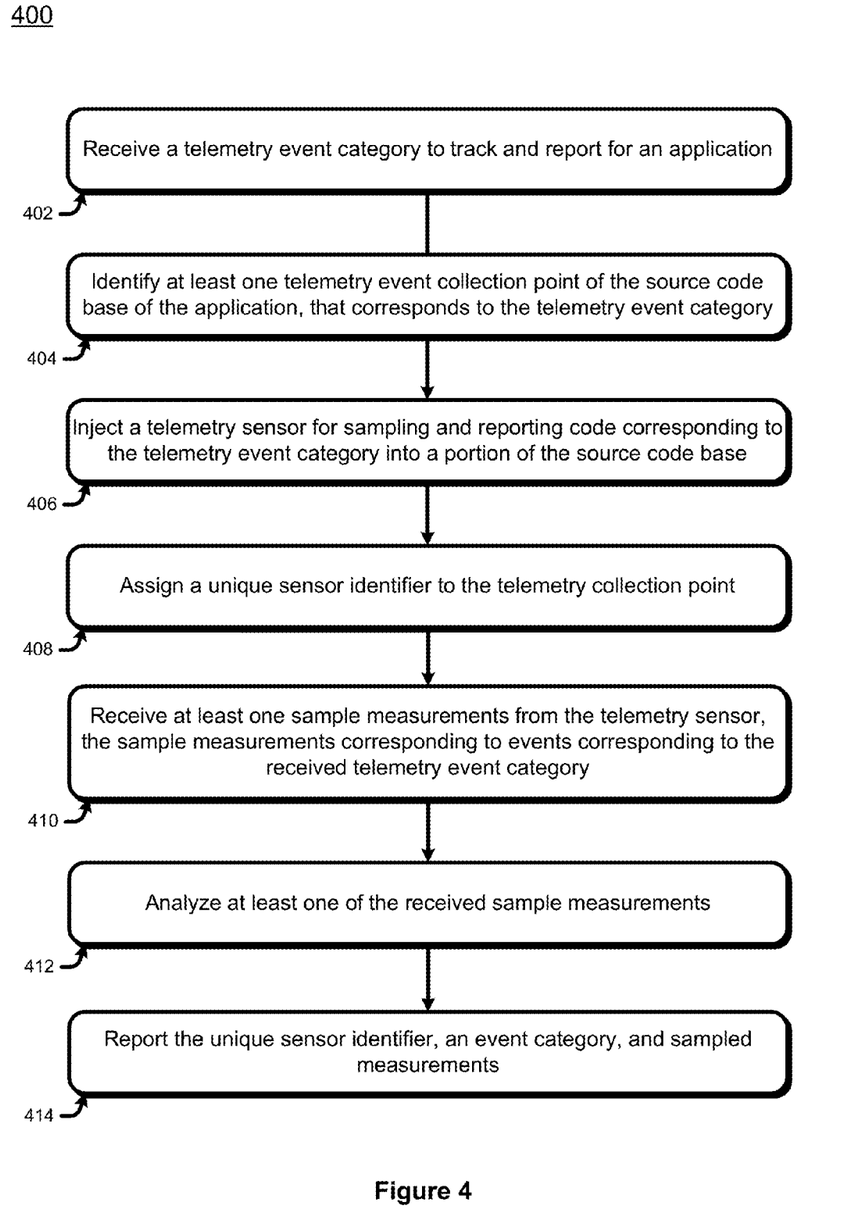
FIG. 4 is a flow chart for injected instrumentation application monitoring and management.

FIG. 4 is a flow chart 400 of Injection Instrumentation Application Monitoring and Management.

In block 402, a technician specifies a telemetry event category to track and report for an application. A telemetry event category is defined by a set of events having a common set of data to be collected, where the events are semantically related. Example event categories are performance, health, security and usability. Exemplary scenarios around event categories are described in further detail in the following sections.

In block 404, the technician identifies at least one telemetry event collection point of the source code base of a computing application to be tested, where the telemetry event collection point that corresponds to the telemetry event category. Specifically, once a telemetry event category is specified, one or more points in the flow control in the logic of the source code base of the computing application, called telemetry event collection points, are identified where and event may be trapped. Collection points may be statically defined. For example, collection for user interface events may be stored as a rule in rule store 318, that all classes/objects corresponding to user interface widgets (e.g. buttons, text boxes), are to be potential collection points for the usability event category.

In block 406, once the telemetry collection point is identified, the migration tool or other automation adding a telemetry sensor comprising code for sampling events and reporting code corresponding to the telemetry event category into a portion of the source code base. The telemetry sensor code could simply be inlined code indicating that execution is passing through a particular portion of code. Alternatively, the telemetry sensor code could be code to subscribe to an existing application event. The reporting code could be a code handler for the event subscribed to by the sensor code which makes a network call to store event data in the data storage component 324. In some cases, to reduce network traffic, the reporting code may buffer event data and batch reporting into fewer network calls.

The addition of the telemetry sensor code and the reporting code is called injecting code. Often injection is performed via a migration tool. The operation of the migration tool is discussed in following sections.

In block 408, a unique sensor identifier is assigned to the telemetry collection point. As stated about, the sensor identifier may be a GUID. In this way, the reporting code may identify the source of any reported data.

In block 410, the telemetry sensor receives at least one sample measurements corresponding to events corresponding to the received telemetry event category. The measurement may be binary, such as a simple indication that an event occurred. The measurement may be numerical, such as an amount of time it took to contact a component, or the execution time elapsed between collection points.

In block 412, the sampled measure is analyzed. Specifically, the telemetry sensor has enlisted in an event, and the event handler retrieves any data providing context for the event. Thus, not only does the telemetry sensor detect an event, in response to detecting the event, the event handler collects metadata, such as the unique sensor identifier, potentially a time stamp of the event from the system clock, and contextual data, such as an error message from the operating system or the computing application under test in the case of a trapped exception. In some cases, the metadata and contextual data may indicate that the event is not warrant reporting. For example, a security measure may indicate that an end user has made a routine access of a non-sensitive database, and a filter may indicate that such events are not be reported. The collection of metadata and contextual data and potential processing of the final data to be reported constitutes analyzing the sampled measure.

In block 414, upon collecting the related data, the data is then reported by the reporting code and stored in data storage component 324. The data in the data storage component 324 may then be further analyzed by the data analyzing component 326 and with analysis results presented/surfaced to a technician via presentation component 328. While analysis often is performed on aggregated data, the data analyzing component 326 may access the data storage component 324 at any time. There are scenarios where is single record is sufficient to merit analysis. Examples of such scenarios include notification of a full system crash, and notification of a serious security breach.

Migration Tool in the Context of Injected Instrumentation Application Monitoring and Management The capabilities to identify collection points and to inject code may be from a migration tool. A migration tool first receives original source code of an application, potentially an architecture specification of the original source code, potentially grammars for any programming languages used in the original source code. The original source code is then parsed into annotated abstract syntax trees.

The migration tool also receives a target architecture specification corresponding to the architecture the application is to be ported to and grammars of the programming languages to be used in the target architecture. The abstract syntax tree may then be annotated with rules and hints on how to port the code.

One feature of the migration tool is that it provides for the automatic determination of which portions of code in the original application are to be mapped to new application layers in the target architecture. This process is known as code separation.

Because the migration tool performs porting operations leveraging both grammatical information and architectural information, it is able to identify collection points. Because the migration tool generates target code, it is able to generated telemetry sensor code and recording code and inject into the final target code.

A migration tool using annotated syntax trees is described in U.S. patent application Ser. No. 13/841,892, "Programming Language Transformations with Abstract Syntax Tree" and is hereby incorporated by reference. A migration tool using grammatical and architectural information to perform transformation is described in U.S. patent application Ser. No. 13/842,892, "Code Separation with Semantic Guarantees" and is hereby incorporated by reference.

Metadata Generation in Injected Instrumentation Application Monitoring and Management Techniques Once sample measurements and related data are stored in data storage component 324, the data may be analyzed. An individual data record may be analyzed in isolation or may be aggregated as in performing statistical analysis or generating histograms.

Also, the data records may be combined to generate other records. One example is to compute the distance between timestamps of two records to calculate an elapsed time. Another example is to generate traces, comprised of a sequential path of collection points. A trace provides a way of capturing an execution path of an application under test.

Figure 5:
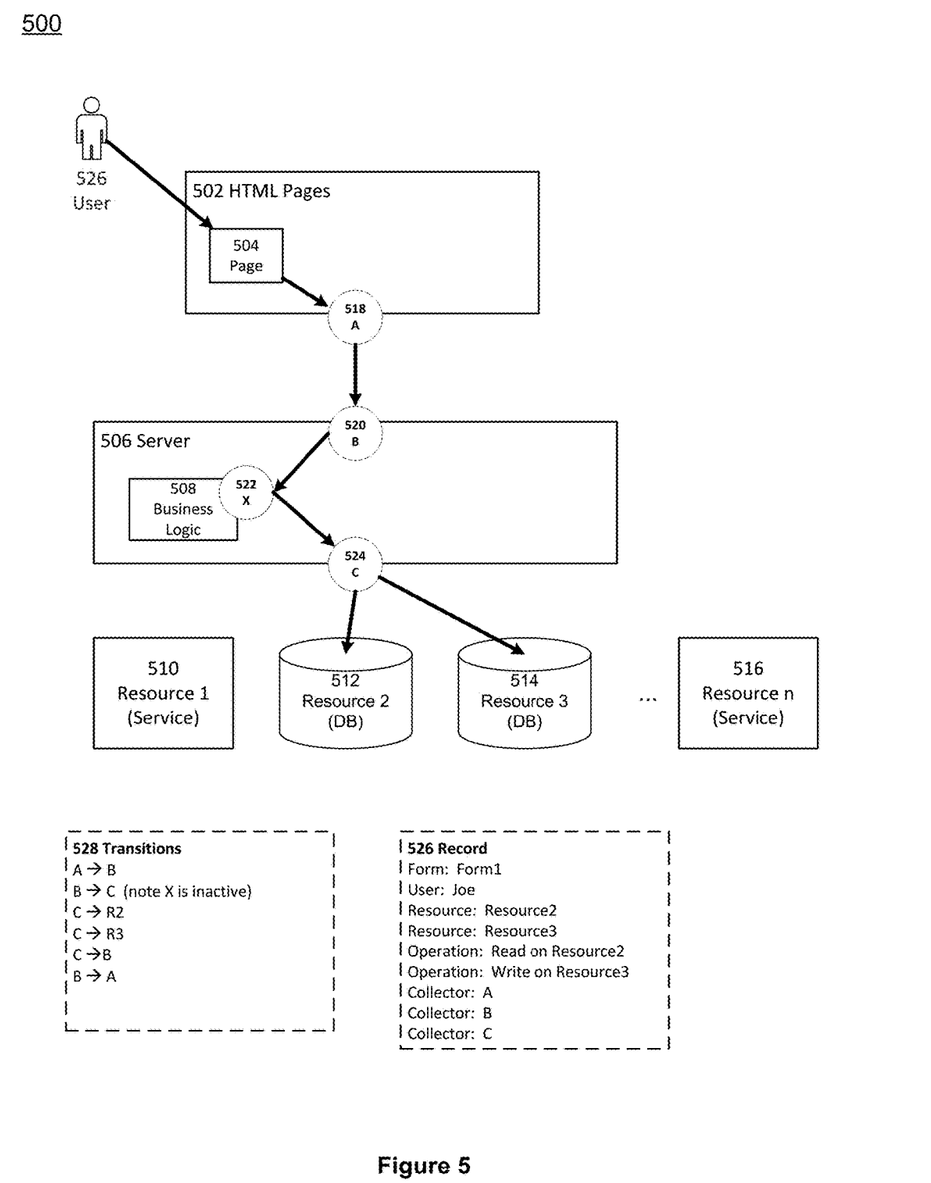
FIG. 5 is context diagram of metadata generation from injected instrumentation application monitoring and management.

FIG. 5 provides an illustration 500 of an example of generating metadata from raw sampled measurements. Consider the following path of execution. An application is comprised of a web client HTML layer 502 including web page 504 in this case representing an HTML form, a customer server holding an business logic application layer 506 including business logic component 508, and a resource/persistence layer comprised of resources/services and databases 510, 512, 514, 516.

Collection points A 518, B 520, X 522, and C 524 have been identified. A 518, B 520 and C 524 are active. Collection point X 522 is known to be in the execution path, but is not presently being tracked.

Execution begins when user 502 accesses web page 504. Web page 504 will access business logic component 508, but on the way will trigger the telemetry sensor code set at collection point A 518 indicating that execution is leaving the web client HTML layer, and the telemetry sensor code set at collection point B 520, indicating that execution is entering the business logic layer 506.

Collection point X 522 may indicate that the specific business logic component 508 is being entered, but note that collection points are not necessarily always instrumented. Rather instrumentation is a function of event category, and the events to be subscribed to.

The business logic component 508 may need to perform a read of database Resource 2 512 and a write of database Resource 3 514. To do so collection point C 524 will detect execution passing through this portion of code.

Note that resources 510, 512, 514, and 516 may be external to the application under test. Accordingly, it may not be possible to instrument the resources. However, collection point C can determine the types of requests to be performed against the resources, and thereby determine that resource 512 is read and resource 514 is written to.

From the foregoing execution, the following data may be collected. Execution record 526 indicates that the test record relates to the web form called "Form 1" and was accessed by a user 526 named "Joe." The record stores the information that Resource 2 and Resource 3 were accessed with read and write operations respectively. Finally, it indicates that collection points A 518, B 520 and C 524 were instrumented.

Turning to Transitions Record 528 it indicates that the path of the collection points were A to B, B to C, C to Resource 2 (for the read), and C to Resource 3 (for the write), C to B and B back to A. Note that neither Resource 2 nor Resource 3 have collection points. Thus there are no R1 or R2 to C transitions recorded. A trace may then be generated with the following tuples:

(A, B), (B, C), (C, R1), (C, R2), (C, B), (C, A).

Examples of analyzing traces will be described in the following sections.

Metadata for Exemplary Analysis Scenarios

The following discussion describes specific analysis scenarios using Injected Instrumentation Application Monitoring and Management techniques. Specifically, application of those techniques to performance, application health, security and usability scenarios are described.

Performance

Performance analysis focuses on measuring the elapsed time to execute various portions of a computer application under test, and interpreting the results. For synchronous execution of a computer application, an instrumentation point may record information at the start and the end of the execution of the portion of the computer application under test, and then the difference of those two times provides the elapsed time. For asynchronous execution of a computer application, the instrumentation point writes two separate messages that are later correlated with each other. Specifically, to correlate the messages, the instrumentation may be used to inject the appropriate tracking information into the remote messages. Since the migration tool generates all layers of a target computing architecture (e.g. both clients and servers) correlation is possible provided an external resource, which cannot be instrumented, is accessed. The following data, which pertains to application performance, may be collected by instrumentation:

Timestamp—The time that data for and event is captured.
Elapsed Time—The elapsed time to execute the operation or the portion of code under test.
Correlation Messages—Posted messages for the start and end of an asynchronous execution as described above.
Message Size—Size of a message being sent to a service or resource. This data is optional since it is not always available.
Request Status—Notification as to whether the request was successful or whether it failed. In the case of a failure, the specific errors is captured.

From the foregoing data collected by instrumentation, reports regarding the performance of a computing application under test may include load time and response time and various statistics such as totals, averages, maxima and minima Issues may be categorized and presented into a histogram. Upon aggregating a statistically significant amount of data, predictive models may be generated from the data. Reports may include statistics on the basis of the following:

Per entry field of a web page,
Per resource accessed in an application,
Per call to a service or external library,
Time between sensor (instrumentation) points,
Per transaction,
Per component, and
Per trace type.

Health

Health measurement focuses on detecting system failures that cause service to become either degraded or unavailable. Note that performance measurements may be an indicator of the health of a system and therefore may also be used for health monitoring. For example, significant variances in response times may indicate system health problems.

The overall health of a computer application under test may be monitored by continuously 'pinging' (i.e., making a small discrete network request of a component where the network response is measured), services in the computer application under test, and comparing the response to the known good response and/or known expected response time ranges. The ping events may include the following data:

Name—Name of the component to be accessed.
Timestamp—Time that the ping was started.
Origin Location—Network location of the origin of the ping.
Response Status—Whether the ping returned, or timed out.
Response Time—Time elapsed for the ping to return (if at all).

In addition to overall health, the health monitoring may also include detecting unexpected errors in the computer application under test by capturing unexpected exceptions at each service and/or the application client. Exception events may include the following data:

Exception Name—Short text name of an exception.
Timestamp—Time that the exception was thrown (occurred).
Service Name—Name of the service that threw the exception.
Exception Details—Long text describing the exception and the any known contextual circumstances.

From the foregoing data collected by instrumentation, reports regarding the health of a computing application under test may include statistics on successful transactions, unsuccessful transactions, and unexpected system errors and/or exceptions. Statistics may include totals, averages, maxima and minima Issues may be categorized and presented into a histogram. Upon aggregating a statistically significant amount of data, predictive models may be generated from the data. Reports may include statistics on the basis of the following:

Per entry field of a web page,
Per resource accessed in an application,
Per call to a service or external library,
Per response status, and
Per trace type.

Security

Security monitoring involves the detection of unauthorized access and attacks on a computer application under test. Because the migration tool has access to both the original source code and the generated source code for a target computing architecture, certain classes of attacks may be protected against. For example, SQL Injection is a well-known attack vector enabled by direct user input being submitted to a SQL database without the computer application validating and authorizing the input SQL. Such attacks may be eliminated by proactively injecting the appropriate filters into the generated target application in order to block such input being submitted to the SQL database. In order to identify unauthorized accesses, the following data may be collected requests submitted to the computer application's services:

- User—Identity of the user making a SQL query.
- User Location—Network address of the source of a SQL query.
- Action Requested—The SQL action to be performed, e.g. create, retrieve, update, or deleting a record, or changing the schema of a database.
- Parameters—Parameters for the SQL query. For example input and output parameters submitted to a SQL stored procedure.
- Resources Accessed—Identity of the SQL database accessed.
- Request Status—Notification as to whether the SQL query was successfully performed or not by the service.

From the foregoing data collected by instrumentation, reports regarding the performance of a computing application under test may include security injections checked (per origin and per type), security injections filtered and/or corrected (per origin and per type), and atypical traces of service requests. Statistics on this data may include totals, averages, maxima and minima Issues may be categorized and presented into a histogram. Upon aggregating a statistically significant amount of data, predictive models may be generated from the data. Reports may include statistics on the basis of the following:

- Per entry field of a web page,
- Between event collection points, and
- Per trace type.

Usability

Usability measurements support the analysis of user behavior at the user interface. Conventional approaches to test user behavior is to instrument client applications with third party code corresponding to third party analytics packages. However, since the migration tool has access to the source code of the original application and generates the source code for the target computer application, the migration tool may inject the appropriate instrumentation into the client facing portions of the generated application. For example, all possible user actions in a user interface may be logged.

A further refinement is to isolate specific use cases. In other words, while the entire user interface may be instrumented, the entire user interface need not be used. Test cases may limit interaction with the user interface only specific scenarios. A client side scenario would be to extract user interface usage in identifying a mobile application. A server side scenario is to exercise a computer application in order to identify the services portion of a computer application. These two operations in combination provide a technique to perform "code separation" i.e. to separate code into architectural layers. Such code separation is particularly useful when migrating monolithic legacy code into multi-tier architectures.

To expand on the code separation scenario, when converting an existing application to a mobile device with a restricted form factor and functionality, an expert user may "exercise" the instrumented application portion of interest. The marked code will then be isolated and extracted, eliminating the non-relevant logic, and creating a first draft of a mobile experience. This piece will then be subjected to a mobile user experience expert for a proper visual components selection, accommodation, and branding. The extraction of the server side of the code (services) is performed analogously.

Traces collected during run time analysis may be used to determine the portions of code in a computing application that relate to user experiences and/or service functionality. The traces and associated database may be used to generate Voronoi maps that partition the source code, to generate Petri nets to characterize a distributed computing application, or to perform other trace classifications and/or clustering. One application of this analysis is to perform code separation as described above.

Performance Scenarios

As described above, Injected Instrumentation Application Monitoring and Managing techniques provide for the detection of run time errors and suboptimal performance. The following are some scenarios.

Overly Chatty Applications

Applications generated by a migration tool generally use original source code, a target computing architecture, and grammars as input. Because the inputs do not include run time data, the migration tool cannot optimize the generated application by reducing the network transactions. Applications that generate too many network transactions thereby degrading response time are called "overly-chatty" applications.

Symptoms of overly-chatty applications may be detected by recording the nature of the interactions between the client and the services. The instrumentation produces a sequence of events that record the following data:

- The web page that originated the service request,
- The type of request (read or write),
- A sequence number or timestamp for the request,
- The information requested, and
- The response time.

Once reported, the sequence of events is analyzed in an effort to detect sequences of reads and writes. Consider a three layer applications with a middle tier component P1, resource tier services R1, R2, R3, and R4, and client components W1 and W2. A trace may be comprised of a tuple (X, Y) meaning component X calls component Y. A trace such as:

(P1, R1), (P1, R2), (P1, R3), (P1, R4), (P1, W1), (P1, W2), (P1, R1) may be restructured to:

(P1, R1 R2 R3 R4), (P1, W1 W2), (P2, R1) Note that calls across layers are batched into a single network transaction, thereby, reducing 7 messages exchanges across layers to 3. By reducing the network calls across layers, performance of the computing application should improve.

Slow Response Times

Chatty application detection can be complemented with a more general approach to detecting response time problems in the apps. Two common problems include:

- User response time is always slow on particular pages (or all pages).
- User response time degrades non-linearly with increased load.

Identifying the cause of these conditions is based on analyzing aggregated performance data as described above. Often the cause of slow response times is from too many messages or from requests that are very resource intensive. The following conditions may suggest the cause of the problems:

- Too many service requests required to satisfy a single user operation. This situation is identified by the number of requests made from a single user interface web page.

A user requests results in resource intensive requests from a service to the resources it uses. The initial indicator is a slow response time to a single message. The resource is identified by observing the correlated resource requests that make the greatest contribution to response time.

The best representation of this information is generally a hierarchical display of response times and message sizes (if available) rooted at the original request from the client.

Unexpected System Errors

As described above, Injected Instrumentation Application Monitoring and Management techniques may detect unexpected exceptions. Such exceptions indicate logic problems in the source code and therefore the computing application under test. A histogram of the most frequent unexpected errors and the client requests that produce them serves as the starting point for determining if any of the unexpected errors is investigated and corrected.

Application Security Compromised/Unauthorized Access

One of the most common security attacks on a computer application is for a malicious party to obtain valid credentials for a user, preferably an administrator, and to use those credentials to damage the system or acquire confidential information.

Injected Instrumentation Application Monitoring and Management techniques may be used to collect information on every action taken by every user. The pattern of actions can be interpreted to generate a pattern of the behavior of the respective users. Analysis of this data may be used to detect a pattern of access that deviates from a particular user's normal pattern of access, such as a multiple invalid credential attempts. This pattern may trigger an alert that the system may have undergone a potential security breach.

Because the migration tool generated the source code of the target application, privileged operations can be augmented with the appropriate injected source code, so that detection of a suspect pattern can challenge the user to provide additional authentication. In this manner the generated target application may be aggressive in detecting potential attacks since an user operation need not be rejected. Rather a suspected user is slightly inconvenienced in being prompted to provide an additional authentication factor.

Injected Instrumentation Application Monitoring and Management techniques may capture and aggregate traces thereby permitting the analysis of sequences of Sensor Identifiers associated with Correlation Tags and Events. For example, if the Correlation Tags was P1, and its associated events (Sensors) were the following:

(P1, E1), (P1, E2), (P1, E2), (P1, E4), (P1, E4), (P1, E5), (P1, E6)

then the trace associated with P1 will then be:

E1, E2, E2, E4, E4, E5, E6.

Consider then another similar trace where one of the E2's is an E4:

E1, E2, E4, E4, E4, E5, E6.

These two traces may be typified in the regular expression:

E1, E2*, E4*, E5, E6.

Note that in general, a set of traces may be typified in this way into a regular expression.

Furthermore, if instead E4 is associated with a password validation event, and the number of logon attempts was more than a predetermined threshold (e.g. 3 logon attempts), then a security alert may be generated. In one embodiment, a two-phase authentication protocol may be triggered.

The set of traces as set forth in a regular expression can also be used to detect a "wander pattern" by a user. Specifically, a user that accesses a resource or performs a function will leave an execution trace. The degree that the trace differs from a baseline set of traces can indicate a potential security breach. Such breaches may be flagged and presented to the technician.

While this type of analysis may be prioritized to analyze privileged users patterns (e.g. testing for compromised admin/superuser accounts); this analysis may be used for any account being used in highly sensitive contexts.

Usability

Usability monitoring is designed to determine if a computing application allows a user to effectively perform the intended functions of the application. For example, if a commerce application results in a large percentage of users abandoning their shopping carts at checkout, the application is probably not providing a convenient checkout experience. Similarly, if a customer relations management (CRM) application's users avoid adding important data to CRM events, the application probably makes providing such data confusing or inconvenient.

These classes of problems are identified by studying statistics produced by analyzing the user actions captured using Injected Instrumentation Application Monitoring and Management techniques.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by at least one computing device that includes a processor and a memory, of injecting telemetry functionality into a source code base of a computer program, comprising:

receiving, at the at least one computing device, a telemetry event category to track and report for an application;

identifying at least one telemetry event collection point of the source code base of the application that corresponds to the telemetry event category;

injecting, by the at least one computing device, a telemetry sensor for sampling and reporting code corresponding to the telemetry event category into a portion of the source code base, the injected telemetry sensor assigning a unique sensor identifier to the telemetry event collection point and collected sampled measurements that include time stamps at the telemetry event collection point; and reporting the unique sensor identifier, an event category, and sampled measurements at the telemetry event collection point.

2. The method of claim 1, wherein the sampled measurements of different sensor identifiers are correlated by a unique transaction identifier.

3. The method of claim 2, wherein the source code base comprises a first source code base for a first application layer and a second source code base for a second application layer in two different programming grammars, and wherein a transaction identifier identifies a message between the first application layer and the second application layer that includes the sampled measurements.

4. The method of claim 1, wherein the source code base includes non-byte-code, the non-byte-code being in one of HTML, JavaScript, or another non-byte-code language.

5. The method of claim 4, wherein sampled measurements, sensor and transaction identifiers are carried in a message between a first application layer and a second application layer of the application.

6. The method of claim 5, wherein the injected telemetry code further comprises time stamp data.

7. The method of claim 5, wherein the sample measurements comprises code execution duration data.

8. The method of claim 5, wherein the telemetry events are to cover at least one of the following types of events:
performance,
health,
security, and
usability.

9. The method of claim 1, further comprising analyzing a plurality of potential execution paths included in code slices of the source code base that is telemetry instrumented to derive one or more transition graphs between one or more telemetry event sensors.

10. The method of claim 9, further comprising using precedence of event sensors for analyzing traces.

11. The method of claim 9, further comprising reducing a set of pattern matching alert rules out of a transition graph grammar for a particular purpose, further comprising checking the set of pattern matching alert rules to select one or more application events comprehended in a pattern for presentation or another action.

12. The method of claim 1, wherein the telemetry sensor generates a set of sensor sampling discipline information, the set of sensor sampling discipline information comprises:
an indication of whether the sensor is on/off switchable;
an indication of debug/production type; an indication of whether the sensor is listenable and/or recordable; and
an indication of whether the sensor transmits data to a monitor each time or buffers data to be transmitted in a block.

13. A system, comprising:
at least one computing device, wherein the at least one computing device includes a processor and a memory, wherein the memory stores a plurality of software components that include computer executable instructions, the software components comprising:
a data collection component that collects information reported from multiple layers of a telemetry instrumented application during monitoring of the application, the information including sampled measurements from one or more telemetry event sensors, at least one unique event sensor identifier, and a transaction unique identifier associated with the monitoring application; and sends the collected information to a monitoring component; and
a monitoring component that receives a collection of execution and information patterns, and receives the collected information on one or more application events from the collection component, and matches the execution and information patterns using pattern matching and sends information on a diversity of criteria which include alerts to at least one of the following components: a data storage component, a data analyzing component, and a presentation component;
a data analyzing component that analyzes sampled data to produce analyzed data regarding the one or more application events;
a presentation component that presents the analyzed data regarding the one or more application events; and
a data storage component that stores the produced and analyzed data regarding the one or more application events.

14. The system of claim 13, the data collection component comprising:
a first data collection sensor located in a HTML page layer of a source code;
a second data collection sensor located in a customer server layer of the source code; and
a third data collection sensor located at an interface between a customer service layer and a resources layer of the source code.

15. The system of claim 13, wherein the monitoring component routes collected information to a user device.

16. The system of claim 13, wherein the presentation component is a console that presents to a user the status of at least one of the following types of information:
overall health;
recent performance history; and
recent performance trend.

17. The system of claim 13, wherein the monitoring component receives at least one of the following:
one or more pattern-matching based alert rules and a collection of telemetry event categories,
a set of visual scenario information specifying telemetry event categories to monitor,
at least one of one or more application concepts or one or more specific sensor identifiers identifying a telemetry event sensor,
one or more transition graphs,
one or more collected record fields specifying formats, and
a correlation tag field, a meaning for the correlation tag field, or a format of the correlation tag field.

18. A method, performed by at least one computing device that includes a processor and a memory, for managing a number of messages between components of an application, comprising:
recording, by the at least one computing device, a set of details of interactions between clients and services of the application;
detecting, by the at least one computing device, within the set of details of interactions between the clients and services a sequence of reads and writes that are reducible to fewer messages by restructuring tracing of the sequence; and
restructuring source code of the application to reduce messages exchanged with a server.

19. The method of claim 18, further comprising:
identifying requests made from a single user interface page; and
observing correlated resource requests of the requests that make the greatest contribution to response time.

20. A method, performed by at least one computing device that includes a processor and a memory, for preventing unauthorized access within an application, the method comprising;
converting, by the at least one computing device, a set of user information collected via telemetry into a pattern of normal or expected behavior for a user;
continuously monitoring within the application in order to detect when a pattern of access to privileged operations of the application deviates from the normal pattern of behavior for the user;

flagging, by the at least one computing device, a potential security breach upon detecting that the pattern of access to privileged operations of the application deviates from the normal pattern of behavior for the user; and challenging, by the at least one computing device, the user after flagging the potential security to provide additional authentication, wherein the set of user information collected via telemetry comprises a sequence of sensor identifiers associated with a correlation tag and event.

21. The method of claim 20 further comprising initiating a two-phase authentication upon detecting that the pattern of access to the privileged operations of the application deviates from the normal pattern of behavior for the user.

22. A system for managing performance, health, security, and usability of an application, the system comprising:

means for embedding data collection sensors in an application layer and in a hosted services layer of source code in the application at multiple telemetry event collection points, each of individual telemetry event collection points being assigning a unique sensor identifier of a data collection sensor of the data collection sensors; and means for transmitting collected data from the data collection sensors to a cloud monitor service, wherein the cloud monitor service stores and analyzes the collected data, wherein the collected data comprises a unique identifier for the telemetry event.

23. The system of claim 22, further comprising means to configure a trigger that sends communication or takes action.

24. The system of claim 23, wherein the trigger is configured to highlight weak points in the source code, transactions to be split, or infrastructure periodically reaching peak performance.

25. The system of claim 22, wherein the trigger is configured to highlight at least one of following types of user behavior:

an error rate on transactions; and a user wander pattern before reaching a user goal.

\* \* \* \* \*